(12) United States Patent
Shukis et al.

(10) Patent No.: US 6,239,054 B1
(45) Date of Patent: May 29, 2001

(54) PROCESS FOR REGENERATING CATALYSTS

(75) Inventors: Peter Joseph Shukis, Bethany; James Donald Carruthers, Fairfield; Vincent Joseph Lostaglio, Stamford, all of CT (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/576,562

(22) Filed: May 22, 2000

Related U.S. Application Data

(62) Division of application No. 09/434,417, filed on Nov. 4, 1999, which is a division of application No. 08/433,381, filed on Sep. 25, 1995, now Pat. No. 6,016,485.

(51) Int. Cl.[7] ............................... B01J 38/50; B01J 20/34

(52) U.S. Cl. ................................ 502/29; 502/22; 502/25; 502/27; 502/28

(58) Field of Search ................. 502/22, 25, 27, 502/28, 29

(56) References Cited

U.S. PATENT DOCUMENTS 5,326,923 * 7/1994 Cooper et al. ........................ 585/725

* cited by examiner

Primary Examiner—Elizabeth D. Wood

(57) ABSTRACT

Provided are high activity catalysts based upon gamma alumina containing substrates impregnated with one or more catalytically active metals, which catalysts in addition contain a nanocrystalline phase of alumina of a crystalline size at the surface of less than 25 Å. Also provided are processes for preparing such high activity catalysts and various uses thereof.

7 Claims, No Drawings

PROCESS FOR REGENERATING CATALYSTS

CROSS REFERENCE TO RELATED APPLICATIONS

This is a continuation of application Ser. No. 09/434,417 filed Nov. 4, 1999, which is a division of application Ser. No. 08/433,381 filed Sep. 25, 1995, now U.S. Pat. No. 6,016,485.

BACKGROUND OF THE INVENTION

1. Field of the Invention

The present invention relates generally to high activity catalysts based upon gamma aluminia containing substrates impregnated with one or more catalytically active metals, processes for preparing the same and uses thereof. More specifically, the present invention relates to process for improving the activity of such catalysts, the improved activity catalysts produced thereby, and various specific catalysts and uses thereof.

2. Description of Related Art

The art relating to particulate porous gamma alumina containing supports, impregnating such supports with various catalytically active metals, metal compounds and/or promoters, and various uses of such impregnated supports as catalysts, is extensive and relatively well developed. As a few of the many exemplary disclosures relating to these yields may be mentioned the following United States patents, all of which are incorporated herein by reference for all purposes as if fully set forth—U.S. Pat. Nos. 2,935,463, 3,032,514, 3,124,418, 3,152,865, 3,232,887, 3,287,280, 3,297,588, 3,493,493, 3,749,664, 3,778,365, 3,897,365, 3,909,453, 3,983,197, 4,090,874, 4,090,982, 4,154,812, 4,179,408, 4,255,282, 4,328,130, 4,357,263, 4,402,865, 4,444,905, 4,447,556, 4,460,707, 4,530,911, 4,588,706, 4,591,429, 4,595,672, 4,652,545, 4,673,664, 4,677,085, 4,732,886, 4,797,196, 4,861,746, 5,002,919, 5,186,818, 5,232,888, 5,246,569 and 5248412.

While the prior art shows a continuous modification and refinement of such catalysts to improve their catalytic activity, and while in some cases highly desirable activities have actually been achieved, there is a continuing need in the industry for even higher activity catalysts, which are provided by the present invention.

As an example of this need may be mentioned the need for a higher activity first stage hydrocracking catalyst. In a typical hydrocracking process, higher molecular weight hydrocarbons are converted to lower molecular weight fractions in the presence of a hydrocracking catalyst which is normally a noble metal impregnated silica-alumina/zeolite. State-of-the-art hydrocracking catalysts possess a very high activity and are capable of cracking high volume throughputs. Such catalysts, however, are highly sensitive to contaminants such as sulfur, metals and nitrogen compounds, which consequently must be removed from the hydrocarbon stream prior to the cracking. This is accomplished in first stage hydrocracking processes such as hydrodenitrogenation, hydrodesulfurization and hydrodemetallation. Hydrotreating catalysts utilized in these processes are typically a combination Group VIB and Group VIII metal impregnated alumina substrate. State-of-the-art hydrotreating catalysts, however, are not sufficiently active to allow processing of the same high volume throughputs as can be processed by the hydrocracking catalysts. As such, the first stage hydrocracking processes form a bottleneck in the overall hydrocracking process, which must be compensated, for example, in the size of the hydrotreating unit relative to the hydrocracking unit.

SUMMARY OF THE INVENTION

In accordance with the present invention, there is provided a high activity catalyst composition comprising, in one aspect, a particulate porous support containing gamma alumina, having a surface area of at least 100 square meters (as measured by nitrogen adsorption) and a pore volume of at least 0.25 cubic centimeters per gram (as measured by mercury porosimetry), and impregnated with one or more catalytically active metals, whereby the catalyst further contains in part a nanocrystalline phase of alumina of a crystallite size at the surface of up to 25 Å.

In another aspect, the present invention provides a high activity catalyst comprising a particulate porous support containing gamma alumina, having a surface area of at least 100 square meters (as measured by nitrogen adsorption) and a pore volume of at least 0.25 cubic centimeters per gram (as measured by mercury porosimetry), and impregnated with one or more catalytically active metals, and which catalyst displays a relative volume activity (RVA) of at least 115, preferably at least 120, and especially at least 125, in a first stage hydrocracking process as measured by the procedure described in the article by Carruthers and DiCamillo, "Pilot Plant Testing of Hydrotreating Catalysts," *Applied Catalysts*, 43 (1988) 253–276, utilizing as the standard a catalyst commercially available under the trade designation HC-H (as of May 1994) from Unocal Corporation, Brea, Calif.

In addition to the above catalyst, the present invention also provides a process for improving the activity of a catalyst composition comprising a particulate porous support comprising gamma alumina and amorphous alumina, having a surface area of at least 100 square meters (as measured by nitrogen adsorption) and a pore volume of at least 0.25 cubic centimeters per gram (as measured by mercury porosimetry), and impregnated with one or more catalytically active metals, by the steps of:

(1) wetting the catalyst composition by contact with a chelating agent in a carrier liquid;

(2) aging the so-wetted substrate while wet;

(3) drying the so-aged substrate at a temperature and under conditions to substantially volatilize the carrier liquid; and (4) calcining the so-dried substrate.

This process can readily be applied to existing catalysts comprising a particulate porous support containing gamma alumina and amorphous alumina, or can be utilized in a catalyst manufacture process prior to, concurrently with and/or subsequent to the impregnation of the support containing gamma alumina and amorphous alumina, with one or more catalytically active metals and/or compounds thereof. In addition, the process can be utilized to improve the activity of spent catalysts during regeneration, which spent catalysts comprise a particulate porous support containing gamma alumina and amorphous alumina, wherein the spent catalyst is wetted as in step (1) above subsequent to the removal of carbonaceous deposits therefrom, followed by steps (2), (3) and (4).

By performing these steps in the indicated order, it is believed (without wishing to be bound by any particular theory) that an interaction takes place between at least the amorphous gamma alumina, chelating agent and catalytically active components, resulting in the appearance of a nanocrystalline phase of alumina of a crystallite size at the surface of the catalyst of up to 25 Å, and preferably between 8 Å and 25 Å, in combination with the gamma alumina which has a crystallite size at the surface of the catalyst of greater than 30 Å, and typically in the range of 30 Å to 70 Å. Crystallite size at the catalyst surface can be measured via well-known techniques involving transmission electron microscopy.

Concurrent with the appearance of this nanocrystalline phase, an increase in the surface area of the catalyst is also achieved. In addition, in preferred embodiments, an at least bimodal mesopore structure is generated with a porosity peaking in a first region of pore size 40 Å or less, and more preferably in the range of 20 Å to 40 Å, and in a second region of pore size 50 Å or greater, and more preferably in the range of 50 Å to 150Å, as measured by nitrogen porosimetry using the desorption isotherm.

The resulting high activity catalysts find use in a wide variety of fields as detailed in the many previously incorporated references. A particularly preferred use is as a first stage hydrocracking catalyst in hydrodenitrogenation, hydrodesulfurization and hydrodemetallation.

These and other features and advantages of the present invention will be more readily understood by those of ordinary skill in the art from a reading of the following detailed description.

DETAILED DESCRIPTION OF THE PREFERRED EMBODIMENTS

Substrates

As indicated above, substrates suitable for use preparing the catalysts of the present invention are particulate porous substrates which comprise at least in part gamma alumina and amorphous alumina, and preferably at least 5 wt % amorphous alumina based on the weight of the substrate. As specific examples may be mentioned substantially alumina substrates, as well as composite substrates in which the alumina acts at least in part as a carrier for other substrates such as silica-aluminas and zeolites. Such substrates and their methods of manufacture are in general well-known to those of ordinary skill in the art, as exemplified by the many previously incorporated references, and reference may be had thereto for further details.

Catalytically Active Metals

The present invention is applicable to catalysts impregnated with one or more of a wide variety of catalytically active metals well-known to those of ordinary skill in the art as exemplified, for example, by the numerous incorporated references. In the context of the present invention, "catalytically active metals" includes both the metals themselves as well as metal compounds. In addition to the catalytically active metals, the catalysts may also be impregnated with one or more well-known promoters such as phosphorous, tin, silica and titanium (including compounds thereof).

Typically, the catalytically active metals are transition metals selected from the group consisting of Group VIB metals, Group VIII metals and combinations thereof. The specific choice of metal(s), promoter(s) and loadings, of course, depends upon the desired end use of the catalyst, and these variables can readily be adjusted by those of ordinary skill in the art based upon the end use. As specific examples thereof may be mentioned the following (wt % is based on the total catalyst weight):

| Hydrotreating Operations | |
|---|---|
| Hydrodenitrogenation | Ni and/or Co, and preferably Ni, in an amount up to 7 wt % calculated as NiO and/or CoO |
| | Mo and/or W, preferably Mo, in an amount up to 35 wt % calculated as $MoO_3$ and/or $WO_3$ |
| | optionally P, and preferably including P, in an amount up to 10 wt % calculated as $P_2O_5$ |
| Hydrodesulfurization | Ni and/or Co, and preferably Co, in an amount up to 9 wt % calculated as NiO and/or CoO |
| | Mo and/or W, preferably Mo, in an amount up to 35 wt % calculated as $MoO_3$ and/or $WO_3$ |
| | optionally P, and preferably including P, in an amount up to 10 wt % calculated as $P_2O_5$ |
| Hydrodemetallation | optionally Ni and/or Co, and preferably including Ni and/or Co, in an amount up to 5 wt % calcuiated as NiO and/or CoO |
| | Mo and/or W, preferably Mo, in an amount up to 20 wt % calculated as $MoO_3$ and/or $WO_3$ |
| | optionally P, and preferably including P, in an amount up to 10 wt % calculated as $P_2O_5$ |
| Hydroconversion | Ni and/or Co, and preferably Ni, in an amount up to 5 wt % calculated as NiO and/or CoO |
| | Mo and/or W, preferably Mo, in an amount up to 20 wt % calculated as $MoO_3$ and/or $WO_3$ |
| | optionally P, and preferably including P, in an amount up to 6 wt % calculated as $P_2O_5$ |
| Hydrocracking | Ni and/or Co, and preferably Ni, in an amount up to 5 wt % calculated as NiO and/or CoO |
| | Mo and/or W, preferably Mo, in an amount up to 20 wt % calculated as $MoO_3$ and/or $WO_3$ |
| | optionally P, and preferably including P, in an amount up to 10 wt % calculated as $P_2O_5$ |
| Hydrogenation/ Dehydrogenation | a noble metal, and preferably Pt or Pt in combination with Rh, in an amount up to 2 wt % calculated on an elementai basis |
| Reforming | a noble metal, and preferably Pt or Pt in combination with another noble metal such Re and/or Ir, and/or Sn, in an |

-continued

| | amount up to 2 wt % calculated on an elemental basis |
|---|---|
| | Non-Hydrotreating Operations |
| Isomerization | a noble metal, and preferably Pt or Pt in combination with another noble metal, in an amount up to 2 wt % calculated on an elemental basis |
| Claus Process | Ni and/or Co, and preferably Ni, in an amount up to 5 wt % calculated as NiO and/or CoO<br>Mo and/or W, preferably Mo, in an amount up to 20 wt % calculated as $MoO_3$ and/or $WO_3$<br>optionally P, and preferably including P, in an amount up to 6 wt % calculated as $P_2O_5$. |

Such catalysts are prepared by impregnating the substrates with the appropriate components, followed by various drying, sulfiding and/or calcining steps as required for the appropriate end use. Such catalyst preparation is generally well-known to those of ordinary skill in the relevant art, as exemplified by the numerous previously incorporated references, and further details may be had by reference thereto or numerous other general reference works available on the subject.

The Inventive Process

As indicated above, the activity of catalytically active metal impregnated carriers comprising gamma alumina and amorphous alumina is improved in accordance with the present invention by the steps of:

(1) wetting the catalyst composition by contact with a chelating agent in a carrier liquid;
(2) aging the so-wetted substrate while wet;
(3) drying the so-aged substrate at a temperature and under conditions to substantially volatilize the carrier liquid; and
(4) calcining the so-dried substrate.

Chelating agents suitable for use in this process include those known to form more stable complexes with transition metals and aluminum and, consequently, possess high stability constants with respect thereto. Particularly preferred for use in the present invention is ethylenediaminetetraacetic acid (EDTA) and derivatives thereof including, for example, N-hydroxy ethylenediaminetetraacetic acid and diammonium ethylenediaminetetraacetic acid. Also suitable are tris (2-aminoethyl)amine and triethylenetetraamine. Other candidates include diethylenetriaminepentaacetic acid, cyclohexanediaminetetraacetic acid, ethyleneglycol-bis-(beta-aminoethylether)-N,N'-tetraacetic acid, tetraethylenepentaamine and the like. The suitability of other chelating agents can be readily determined by those of ordinary skill in the art by treating a catalyst sample in accordance with the present invention then determining with the aid of transmission electron microscopy whether or not the nanocrystalline alumina structure of appropriate crystallite size has formed.

The amount of chelating agent utilized is not critical to obtaining the effect, but does have an influence on the degree of effect. Widely varying amounts of chelating agent can be utilized depending on a number of factors such as solubility in the carrier liquid, type of catalyst support and metals impregnated or to be impregnated thereon. Generally, the catalyst composition should be wetted by a carrier liquid containing the chelating agent in amounts ranging from 0.01–1.0 grams of chelating agent per gram of catalyst composition.

The catalyst composition may be wetted by any normal method such as dipping or spraying. To ensure adequate infiltration of the chelating agent, dipping is preferred followed by a soaking period. The preferred carrier liquid is water or a water/ammonia solution.

Aging of the substrate is a function of the temperature during aging. At room temperature, it is preferred to age the wetted substrate for at least 10 days, more preferably at least 14 days. As temperature increases, the required aging time decreases. At 60° C., it is preferred to age the wetted substrate for at least one day, more preferably at least three days. The aging can be further accelerated to as little as one hour by heating the wetted sample in a microwave oven. Preferably aging is accomplished at a temperature in the range of 20° C. to 90° C.

Subsequently, the aged catalyst is dried to substantially remove the carrier liquid. It is preferred that the drying take place rapidly at elevated temperatures in the range of 100° C. to 250° C. Preferably, a forced air heater is utilized to speed drying to a preferred time of less than one hour.

The so-dried catalyst is then calcined under conditions well-known to those of ordinary skill in the art. Preferably, however, the calcination takes place in two stages—a first lower temperature stage in which the temperature is sufficiently high to drive off or decompose any remaining chelating agent, but which is not so high that the chelating agents combusts to form carbonaceous deposits. This first stage temperature will vary depending on the particularly chelating agent, but typically a temperature within the range of 250° C. to 350° C. will be sufficient. Once any remaining chelating agent is substantially removed, the catalyst may then be calcined under the normal higher temperature conditions commonly utilized.

As indicated above, the process in accordance with the present invention is not only applicable to pre-formed catalysts, but also can be applied to regenerated catalysts in a like manner. Specifically, subsequent to the removal of carbonaceous material from a spent catalyst via well-known procedures, such catalysts are then be treated by steps (1) through (4) in an identical manner as described above.

This procedure can also be adapted during the production of new catalyst. Specifically, the substrate can be wetted with the chelating agent/carrier liquid either prior to, concurrently with and/or subsequent to the impregnation of the support with the appropriate catalytically active metals, followed by steps (2) through (4) as described above. It is only important to ensure that the aging step takes place while the impregnated support is wet from the carrier liquid for the chelating agent and/or impregnation metals.

The present invention as described above will be further exemplified by the following specific examples which are provided by way of illustration and not limitation thereof.

The abbreviations in these examples have the following meanings:

EDTA ethylenediaminetetraacetic acid
MEA monoethanolamine

SA(N$_2$) surface area measured by nitrogen adsorption

SA/gAl$_2$O$_3$ surface area per gram alumina

RVA relative volume activity in a 1st stage hydrocracking test, measured as described in the article by Carruthers and DiCamillo, "Pilot Plant Testing of Hydrotreating Catalysts," *Applied Catalysts*, 43 (1988) 253–276. The relative volume activity is determined utilizing as the standard a catalyst commercially available (as of May 1994) under the trade designation HC-H from Unocal Corporation, Brea, Calif.

RWA relative weight activity, determined in accordance with the aforementioned article.

EXAMPLE 1

266 grams of an alumina catalyst support, commercially available from Criterion Catalyst Company (Houston, Tex.), prepared from alumina powder containing some amorphous alumina hydrate, and with a pore volume of 0.62 cc/g (as measured by mercury porosimetry) and pore size peaking at 78 Å (as measured by nitrogen porosimetry using the desorption isotherm), were placed in a stainless basket and dipped into 1800 mls. of an aqueous impregnating solution. The impregnating solution, identified as solution 'A', was prepared by dissolving 900 grams of molybdenum trioxide and 221 grams of nickel oxide in a dilute solution of phosphoric acid (263 grams of 85% solution in 1509 g of DI water). To the solution was added 226 grams of solid EDTA. The solution was then recirculated over the alumina support for one hour, The wet impregnated support was then removed from the basket and centrifuged.

The wet support was split into four lots and allowed to age in a sealed container at room temperature for 2 hours, 3 days, 14 days and 22 days. Following this, each lot was dried using either a standard drying procedure (250° F. (121° C.) for 1 hour) or a fast drying procedure (300° F. (149° C.) for 20 mins. with high air flow). Each sample was then transferred to a muffle furnace and calcined at 850° F. (454° C.) for 1 hour. The resulting catalysts are identified as E1, E2, E3, E4 and E5 in Table 1 below.

A second series of catalysts was prepared in an identical manner as above except that in place of the EDTA was added 94.3 grams of MEA. The wet impregnated support was split into two portions and aged at room temperature for 2 hours and 15 days. The catalysts were dried using the Fast Dry procedure and calcined as described above. The resulting catalysts are identified as M1 and M2 respectively in Table 1.

A third series of catalysts prepared in an identical manner as set forth above, except that in place of the EDTA was added 183 grams of succinic acid. The wet impregnated support was then split into two portions and aged at room temperature for 2 hours and 18 days. The catalysts were dried using the Fast Dry procedure and calcined as described above. The resulting catalysts are identified as S1 and S2 respectively in Table 1.

A fourth series of catalysts was prepared in an identical manner as set forth above, except that in place of the EDTA was added 216 grams of citric acid. The wet impregnated support was then split into three portions and aged at room temperature for 2 hours, 2 days and 9 days. The catalysts were dried using the Fast Dry procedure and calcined as described above. The resulting catalysts are identified as C1, C2 and C3 in Table 1.

Finally, a control series of catalysts was prepared in an identical manner as set forth above, except that no EDTA was added. The wet impregnated support was split into two portions and aged at room temperature for 2 hours and 12 days. The catalysts were dried using the Fast Dry procedure and calcined as described above. The resulting catalysts are identified in Table 1 below as A1 and A2.

Although some surface area increase was measured for each of the samples aged beyond 10 days, only one chelating agent of this set, EDTA, brought about a significant increase in catalytic activity (samples E4 and E5). Similarly, in parallel with the catalyst activity results, Analytical Electron Microscopy (AEM) showed clear evidence for the presence of the "nanocrystalline" phase of alumina in the EDTA treated and aged samples but not in the alumina of the other samples treated with other agents, nor in the alumina of the untreated samples A1 and A2.

TABLE 1

| Sample ID | Agent | Age Time | Drying Method | SA(N$_2$) m$^2$/g | RVA-TN % |
|---|---|---|---|---|---|
| E1 | EDTA | 2 hrs | Fast dry | 163 | 94 |
| E2 | EDTA | 3 days | Fast dry | 198 | 87 |
| E3 | EDTA | 14 days | Slow dry | 92 | 107 |
| E4 | EDTA | 14 days | Fast dry | 195 | 120 |
| E5 | EDTA | 22 days | Fast dry | 203 | 125 |
| M1 | MEA | 2 hrs | Fast dry | 179 | 100 |
| M2 | MEA | 15 days | Fast dry | 187 | 109 |
| S1 | Suc. acid | 2 hrs | Fast dry | 180 | 103 |
| S2 | Suc. acid | 18 days | Fast dry | 201 | 110 |
| C1 | Citric acid | 2 hrs | Fast dry | 181 | 92 |
| C2 | Citric acid | 2 days | Fast dry | 186 | 110 |
| C3 | Citric acid | 9 days | Fast dry | 206 | 100 |
| A1 | None | 2 hrs | Fast dry | 160 | 98 |
| A2 | None | 12 days | Fast dry | 170 | 101 |

EXAMPLE 2

188 grams of the alumina support described in Example 1 was processed with 1300 ml. of solution 'A' in an identical manner to in Example 1, except that in place of the EDIA was added 100 grams of solid diammonium-EDTA.

The wet impregnated support was split into two lots, and one portion allowed to age at room temperature (68° F., 20° C.) for 2 hours while a second portion was placed in a sealed container and aged at 140° F. (60° C.) for 17 hours. The two portions were dried at 450° F. (232° C.) for 20 mins. prior to finishing in a calciner at 800° F. (427° C.). The samples are identified in Table 2 as DE1 and DE2 respectively.

The sample aged for 17 hrs. at 140° F. (60° C.) and fast-dried exhibited high catalytic activity, similar to that obtained using the EDTA acid in Example 1 above.

TABLE 2

| Sample ID | Age Time hours | Age Temp ° F.(° C.) | SA(N$_2$) m$^2$/g | SA/gAl$_2$O$_3$ m$^2$/g | RVA-TN % |
|---|---|---|---|---|---|
| DE1 | 2 | 68(20) | 164 | 253 | 100 |
| DE2 | 17 | 140(60) | 170 | 262 | 120 |

EXAMPLE 3

100 grams of the alumina support described in Example 1 was impregnated by saturating the pore structure of the support with solution 'B', prepared by adding 46.7 grams of a solution 'C' comprising 36.8 wt. % molybdenum trioxide, 6.5 wt. % nickel oxide and 10.0 wt. % phosphorus pentoxide to 30 grams of a 44.7 wt. % solution of diammonium EDTA and 23 mls. of concentrated (29 wt. %) ammonia. The material was then aged for 2 hours and dried in a two step process, first at 250° F. (121° C.) for 2 hours and then at 500° F. (260° C.) for a further 2 hours.

The dried catalyst was then subjected to a second pore saturation using solution 'D', which comprised 46.7 grams of solution 'C' diluted with 23 mls. of water. The wet impregnated support was then aged in a sealed vessel at 158° F. (70° C.) for 18 hours in an oven. The catalyst was Fast Dried and calcined in the same manner as described before. The catalyst is designated 'F1' in Table 3.

TABLE 3

| Sample ID | NiO wt % | MoO$_3$ wt % | P$_2$O$_5$ wt % | SA(N$_2$) m$^2$/g | SA/gAl$_2$O$_3$ m$^2$/g | RVA-TN % |
|---|---|---|---|---|---|---|
| F1 | 3.86 | 24.2 | 5.75 | 200 | 303 | 121 |

EXAMPLE 4

750 grams of an alumina catalyst support commercially available from Criterion Catalyst Company (Houston, Tex.) prepared from alumina powder containing some amorphous alumina hydrate with a pore volume of 0.78 cc/g and a pore size of 82 angstroms was placed in a stainless basket and dipped into 5300 ml. of a solution 'E' comprising 32 wt. % molybdenum trioxide, 7.2 wt. % nickel oxide and 10.7 wt. % phosphoric acid. The solution was then recirculated over the alumina support for one hour after which the wet support was removed from the basket and centrifuged.

The wet impregnated support was allowed to age for 2 hours at room temperature and then dried at 250° F. (121° C.) in an oven and calcined at 800° F. (427° C.) for 1 hour.

Seven 100 gram samples of the finished catalyst were then subjected to pore volume saturation using eight different aqueous solutions of chelating agents:

(1) 7.6 g. of Ethylenediamine-N,N-diacetic acid in 47 ml. of solution.

(2) 8.25 g. of Nitrilotriacetic acid in 37 ml. of solution.

(3) 12.7 g. of tris-(2-aminoethyl)amine in 37 ml. of solution.

(4) 8.0 g. of Ethylenediamine in 38 ml. of solution.

(5) 8.0 g. of Ethylene Glycol in 37 ml. of solution.

(6) 11.5 g. of Triethylene tetramine in 37 ml. of solution.

(7) 31.5 g. of a 44.7 wt. % diammonium ethylenediamine tetraacetic acid solution in 40 ml. of solution.

Each sample was then aged at 167° F. (75° C.) in a sealed container for 3 days, allowed to cool and then Fast Dried at 450° F. (232° C.) for 20 mins. prior to final calcination at 850° F. (454° C.). Each catalyst was then analyzed and activity tested in the 1st. Stage Hydrocracking catalyst test for nitrogen removal (Table 4).

TABLE 4

| | S.A (N$_2$) m$^2$/g | SA/g Al$_2$O$_3$ m$^2$/g | RVA % |
|---|---|---|---|
| (1) Ethylenediamine-N,N-diacetic acid | 143 | 242 | 108 |
| (2) Nitrilotriacetic acid | 173 | 293 | 102 |
| (3) Tris(2-aminoethyl) amine | 166 | 281 | 133 |
| (4) Ethylene Diamine | 167 | 283 | 106 |
| (5) Ethylene Glycol | 137 | 232 | 106 |
| (6) Triethylene tetramine | 160 | 271 | 126 |

TABLE 4-continued

| | S.A (N$_2$) m$^2$/g | SA/g Al$_2$O$_3$ m$^2$/g | RVA % |
|---|---|---|---|
| (7) Diammonium EDTA | 205 | 347 | 137 |
| (8) No chelating agent | 132 | 224 | 101 |

EXAMPLE 5

150 grams of an alumina catalyst support commercially available from Criterion Catalyst Company (Houston, Tex.) prepared from alumina powder containing some amorphous alumina hydrate with a pore volume of 0.71 cc/g and a pore size of 78 angstroms was pore saturated with a solution 'F' containing 240 grams of diammonium-EDTA in 1 liter of aqueous solution. A second 150 gram sample of support was then pore saturated with a 66:33 solution 'F': water mixture. A third 150 gram sample was then prepared by pore saturation with a 50:50, solution 'F': water mixture.

Each of the wet impregnated supports was then allowed to stand for 2 hours followed by drying in an air oven at 450° F. (232° C.). Each dried material was then placed in a stainless basket and dipped into 1200 ml. of solution 'E' (see Example 4). The solution was then recirculated over the dried alumina support containing the diammonium-EDTA for one hour after which the pills were centrifuged and allowed to age in a sealed container for 64 hours at 140° F. (60° C.). The wet catalyst was then fast dried at 450° F. (232° C.) for 20 minutes in air, and calcined at 800° F. (427° C.) for one hour.

The finished catalysts differed in surface area on both a "per gram of catalyst" basis as well as on a "per gram of alumina" basis. The catalyst activities in the hydrodenitrogenation test declined stepwise, paralleling the decreasing catalyst surface areas and the corresponding decreasing concentrations of pre-impregnated diammonium-EDTA (Table 5).

TABLE 5

| | S.A(N$_2$) m$^2$/g | SA/gAl$_2$O$_3$ m$^2$/g | RVA % | RWA % |
|---|---|---|---|---|
| 100% Sol 'F' | 240 | 350 | 124 | 137 |
| 66% Sol 'F' | 207 | 314 | 116 | 124 |
| 50% Sol 'F' | 198 | 301 | 118 | 124 |

EXAMPLE 6

150 grams of the alumina support described in Example 4 was pore saturated with a solution 'G' containing 48 grams of diammonium-EDTA, 9 grams of 29 wt. % ammonium hydroxide and 12.7 grams of nickel nitrate hexahydrate in 114 ml. of aqueous solution. The wet material was allowed to stand for 2 hours before being dried at 250° F. (121° C.) for 1 hour in an air oven followed by drying at 375° F. (191° C.) for 1 hour. The dried material was then placed in a stainless basket and dipped into a solution 'H' containing 35.6 wt. % molybdenum trioxide, 9.1 wt. % phosphoric acid and 7.3 wt. % nickel oxide. The solution was then recirculated over the dried alumina support containing the diammonium-EDTA for one hour after which the pills were centrifuged. The resulting material was split into two parts, with one part allowed to age at room temperature for three weeks (sample 6A) while the other part was placed in a sealed container and allowed to age for 72 hours at 167° F.

(75° C.) (sample 6B). Both parts were subsequently fast dried at 450° F. (232° C.) for 20 mins. and calcined in two stages: at 575° F. (302° C.) for 30 minutes followed by 850° F. (454° C.) for one hour. The finished catalysts exhibited very similar surface areas and high activities in the hydrodenitrogenation test (Table 6).

EXAMPLE 7

200 grams of the alumina support described in Example 4 was pore saturated with a solution 'J' containing 48 grams of diammonium-EDTA, 15.3 grams of 29 wt. % ammonium hydroxide and 62 grams of solution 'K' comprising 32.8 wt. % molybdenum trioxide, 5.9 wt. % nickel oxide and 9.0 wt. % phosphoric acid. The wet impregnated support was then allowed to stand for 2 hours and dried, first at 250° F. (121° C.) for 1 hour and then at 450° F. (232° C.) for 1 hour. The dried material was then placed in a stainless basket and dipped into 1400 ml of solution 'H'. The solution was then recirculated over the dried alumina support containing the diammonium-EDTA for one hour after which the pills were centrifuged. The resulting material was allowed to age in a sealed container for 3 days at 167° F. (75° C.) (sample 7A), and was subsequently fast dried at 450° F. (232° C.) for 20 minutes and calcined in two stages as set forth in Example 6. The surface area enhancement and catalyst activity in the hydrodenitrogenation test were both very high. The results are also shown in Table 6.

TABLE 6

| Sample ID | Age Time hours | Age Temp ° F.(° C.) | SA($N_2$) $m^2/g$ | SA/g$Al_2O_3$ $m^2/g$ | RVA-TN % |
|---|---|---|---|---|---|
| 6A | 72 | 167(75) | 244 | 402 | 132 |
| 6B | 504 | 68(20) | 208 | 343 | 134 |
| 7A | 161 | 167(75) | 259 | 401 | 136 |

EXAMPLE 8

300 grams of the alumina support described in Example 4 was pore saturated with a solution containing 80 grams of diammonium EDTA, 25.2 grams of 29 wt. % ammonium and 92 grams of solution 'K' (see Example 7). The wet impregnated support was then allowed to stand for 2 hours and dried first at 250° F. (121° C.) for 1 hour then at 450° F. (232° C.) for another hour. The dried material was then placed in a stainless steel basket and dipped into 1900 ml. of solution 'H'. The solution was then recirculated over the dried alumina support containing the diammonium-EDTA for one hour after which the pills were centrifuged. The resulting material was split into two portions, with one part allowed to age for 16 hrs. at 167° F. (75° C.) (sample 9A) while the second part was aged for 1 hour in a sealed container in a Microwave oven set to control the temperature of the catalyst at 167° F. (75° C.) (sample 9B). The samples were subsequently Fast Dried and calcined as before. The surface area enhancement and catalytic activities for the two materials were both good (Table 7).

TABLE 7

| Sample ID | Age Time hours | Age Temp ° F.(° C.) | SA($N_2$) $m^2/g$ | SA/g$Al_2O_3$ $m^2/g$ | RVA-RN % |
|---|---|---|---|---|---|
| 9A | 1 | 167(75) | 173 | 284 | 125 |
| 9B | 16 | 167(75) | 189 | 306 | 127 |

EXAMPLE 9

310 grams of a commercially regenerated used sample of Criterion C-424 catalyst (Criterion Catalyst Company, Houston, Tex.) was pore saturated with a solution containing 54.7 grams of diammonium EDTA. The sample was then aged at 140° F. (60° C.) in a sealed container for 4 days followed by Fast Drying and calcination as before (sample 10A). Both the commercially regenerated sample of C-424 (sample 10B) and the EDTA-treated sample were activity tested in a test designed to compare the performance of catalysts in Catalytic Hydrotreatment of feedstock prior to Fluid Cat. Cracking (a CFH test). Results of the test and the test conditions are shown in Table 8. It can be seen that the EDTA-treated regenerated catalyst had a significantly improved performance compared to the regenerated catalyst in both HDS and HDN.

TABLE 8

| Sample ID | Description | RVA-HDN % | RVA-HDS % |
|---|---|---|---|
| | C-424 Fresh | 100 | 100 |
| 10B | Regenerated | 75 | 69 |
| 10A | Regenerated/ EDTA treated | 90 | 86 |

CFH Test:

Feed: Cat. Cracked Heavy Gas Oil

| $H_2$ Pressure: | 1100 psig (76 atm) |
| $H_2$/Oil: | 4210 SCF/bbl (0.75 $m^3$/l) |
| LHSV: | 2 $hr^{-1}$ |
| Temperature: | 630° F.(332° C.) |

We claim:

1. A process for regenerating a spent catalyst composition comprising a particulate porous support comprising gamma alumina, amorphous alumina, and one or more catalytically active metals, the process comprising the steps of:
   (1) treating the spent catalyst to remove carbonaceous deposits;
   (2) wetting the treated support by contact with a chelating agent in a carrier liquid;
   (3) aging the wetted support while wet;
   (4) drying the aged support at a temperature and under conditions to substantially volatilize the carrier liquid; and
   (5) calcining the dried support.

2. The process of claim 1, wherein the chelating agent possesses a high stability constant with respect to the catalytically active metals of the catalyst.

3. The process of claim 1, wherein the chelating agent is ethylendiaminetetraacetic acid or a derivative thereof.

4. The process of claim 1, wherein the chelating agent is selected from the group consisting of ethylenediaminetetraacetic acid, diammonium ethylenediaminetetraacetic acid, tris(2-aminoethyl)amine and triethylenetetraamine.

5. The process of claim 1, wherein the aged substrate is dried at a temperature in the range of 100° C. to 250° C.

6. The process of claim 1, wherein the aged substrate is dried with the aid of a forced air heater.

7. The process of claim 1, wherein the dried substrate is calcined in a first stage at a temperature which is sufficiently high to drive off or decompose the chelating agent, but which is not so high that the chelating agent combusts to form carbonaceous deposits, and in a second stage at normal calcining temperatures.

* * * * *